May 12, 1936.  H. S. BAKER  2,040,681
GAUGE
Filed Aug. 12, 1931   2 Sheets-Sheet 1

Inventor:
Harry S. Baker
by George A. Rockwell
Att'y.

May 12, 1936.　　　　H. S. BAKER　　　　2,040,681
GAUGE
Filed Aug. 12, 1931　　　2 Sheets-Sheet 2
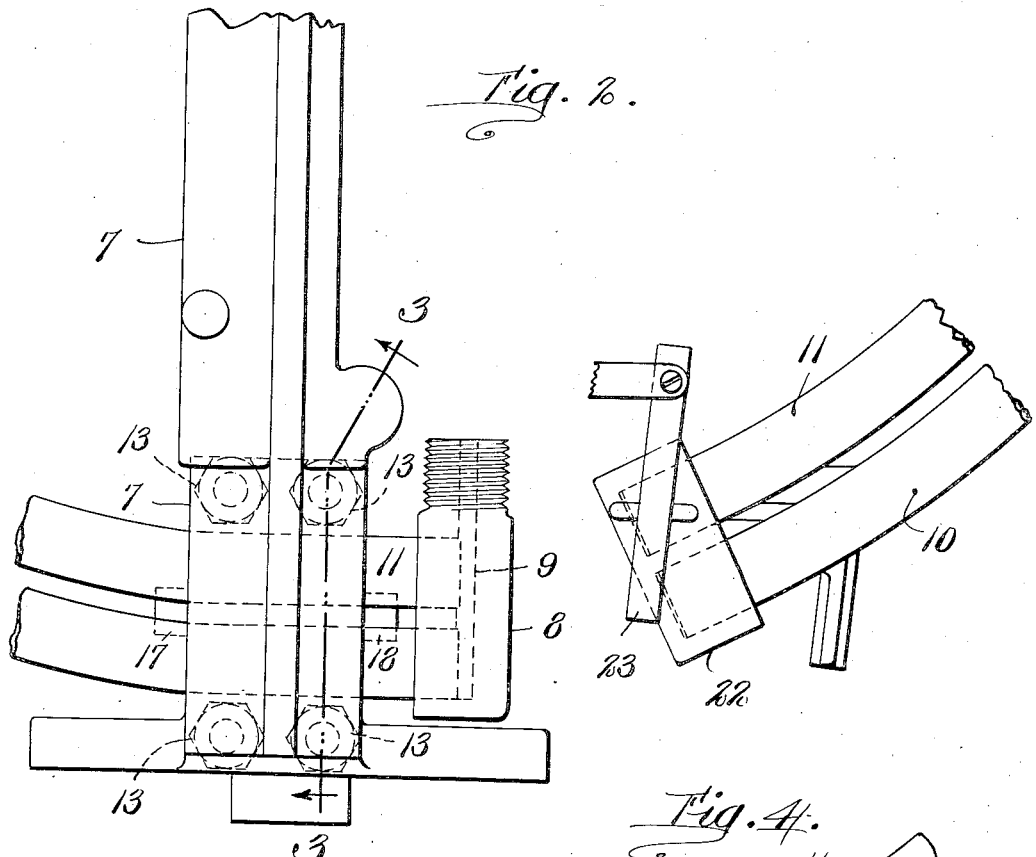
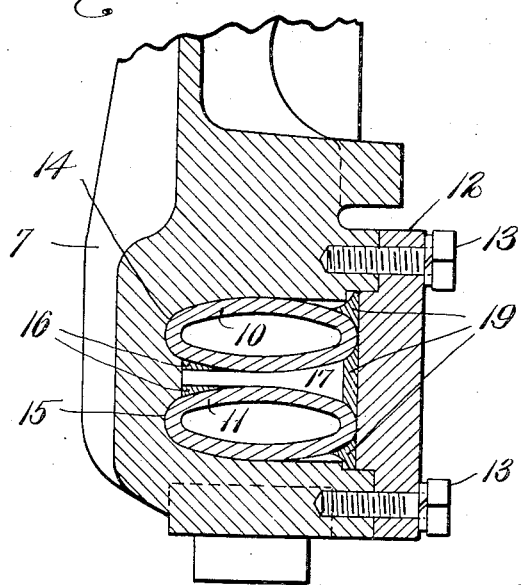
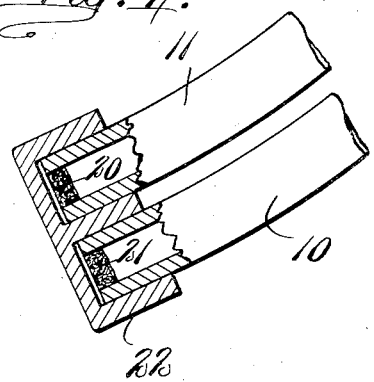
Inventor:
Harry S. Baker
by George A. Rockwell
Att'y.

Patented May 12, 1936

2,040,681

UNITED STATES PATENT OFFICE 2,040,681

GAUGE

Harry S. Baker, Arlington, Mass., assignor to
The Ashton Valve Company, Cambridge, Mass.,
a corporation of Massachusetts Application August 12, 1931, Serial No. 556,549

3 Claims. (Cl. 73—109)

My invention relates to gauges of the type whose operating mechanism includes one or more Bourdon tube springs and the principal object of my invention is to improve the efficiency and accuracy of such tubes.

Some of the objects of my invention are to provide a practical arrangement for soldering, welding or brazing pressure connections to the tubes allowing the use of fittings of small volume and of a section nearly that of a tube section at points where pressure tight connections are required; to provide a convenient arrangement whereby the tubes and welded joints can be heat-treated without injury to the other parts of the instruments in case such other parts are made of materials which could not stand the high heat required for such treatment; and to provide means for relieving the pressure joints of the strain set up by the working of the tube under pressure and of those due to external vibration.

Other objects will be pointed out below.

A feature of my invention is the mounting of the fixed end or ends of the tube or tubes so as to relieve the operating strains on such end or ends.

Other features will be pointed out below.

In the drawings—

Figure 2 is an enlarged detail of portions thereof;

Figure 3 is a section on line 3—3 of Figure 2;

Figure 4 is a detail section, partly in elevation, of the movable ends of the tubes;

Figure 1:
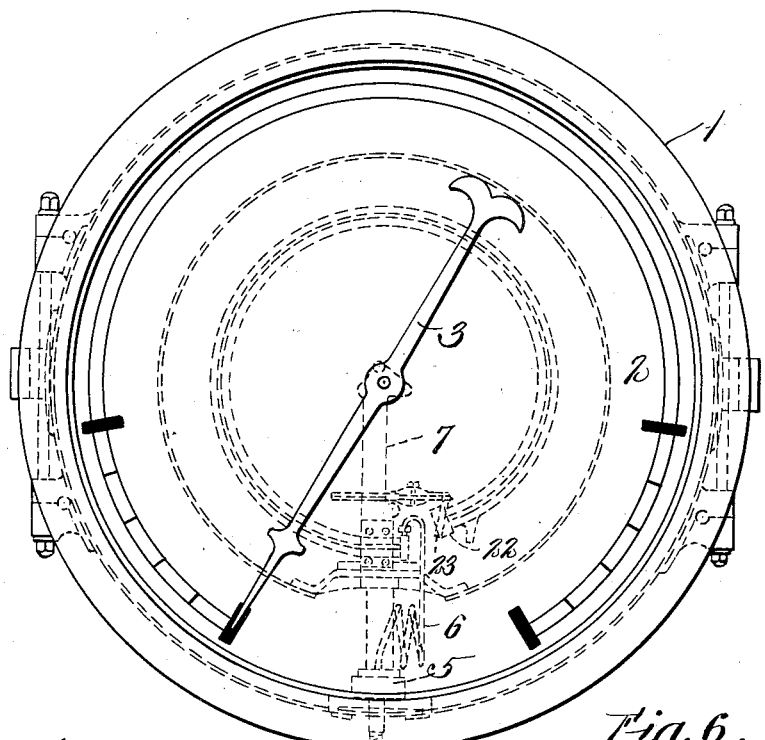
Figure 1 is an elevation of a gauge embodying my invention.

The gauge casing 1 may be as shown in Figure 1 or of any suitable construction and supports the dial 2 and indicator 3.

Steam or other material under pressure enters through hollow member 4 and is conducted through member 5 to the flexible conduit 6 more fully described below.

Bracket 7 is suitably mounted on the casing and is extended upwardly to form a support for the indicator 3 and for the ordinary sector (not shown) which operates the indicator and which is operated by any suitable mechanism operatively connected with the movable ends of the Bourdon tubes.

The material under pressure is conducted, as above explained, to conduit 6 which, as shown in Figure 1, is flexible tubing, attached to the cap 8 (Figure 2), the cap having a passage 9 conducting the material under pressure to the open fixed ends of the Bourdon tubes 10 and 11, these tubes being less than a complete circle. The cap may be provided with apertures to receive the ends of the Bourdon tubes so that said ends will be adjacent to passage 9, the ends of the tubes being welded in said apertures to the cap 8.

At a distance from their fixed ends the tubes are clamped between the bracket 7 and the clamping element 12 held to the bracket 7 by threaded bolts 13. Before the clamping element 12 is applied the desired portions of the tubes are placed within a main recess in bracket 7 from which extend curved recesses 14 and 15 to fit a side of each tube, the interior of the main recess partially fitting the top of tube 10 and the bottom of tube 11. Solder 16 may be applied, as shown in Figure 3, to the edges of the tubes to hold the latter to the bracket 7 and wedges 17 and 18 are then applied to aid in holding the tubes in place. To the right side portions of the tubes, and between the tubes, I apply solder 19 to further hold the tubes. I then attach clamping member 12 to bracket 7 by nuts 13, the member 12 preferably engaging the edges of the Bourdon tubes.

The movable ends of the tubes 10 and 11 are closed and made pressure tight by welding, soldering or brazing as indicated at 20 and 21 and the ends then enter recesses in cap 22 and are welded therein or otherwise secured thereto, the cap 22 being operatively connected with member 23 which, in turn, may be suitably connected with the sector referred to above so as to operate the indicator 3.

I have just described a form of my invention in which the tubes are soldered to one member of the clamp but it is to be understood that the tube or tubes may be brazed or welded to such member or otherwise securely held thereto and it is also to be understood that my invention is, in its broad aspect, the supporting of the tubes at a distance from their fixed ends.

Figure 5:
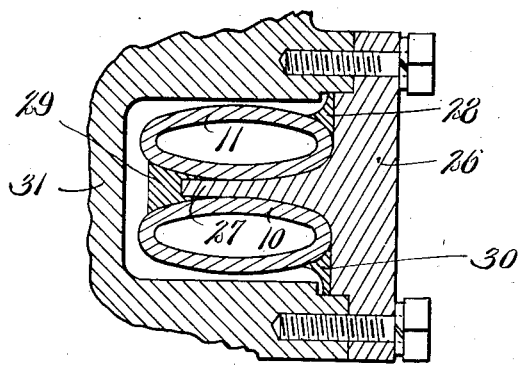
Figure 5 is a section, similar to Figure 3, of a modification described below.

In Figure 5 I show the form which I prefer and in this form the member 26 has an integral wedge portion 27, the tubes being soldered, brazed or welded to member 26 and portion 27 as indicated at 28, 29 and 30, clearance being provided around the tubes as shown. In this form the member 26 is welded, soldered or brazed to the tubes before assembly on member 31.

Figure 6:
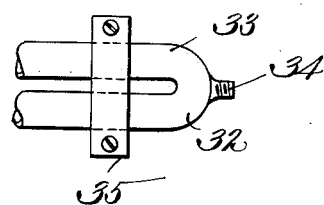
Figure 6 is a detail described below.

In Figure 6 I show a modification in which the two fixed ends 32 and 33 of the tubes merge into each other, a nipple 34 being provided to receive the pressure from conduit 6. In this form a clamp 35 or other means may be employed to engage the tubes at a distance from their fixed ends to relieve the strain as above explained.

An important advantage of my invention is that it relieves the strain on the pressure tight joint formed between the tubes and support heretofore present when the fixed ends of the tubes were held by the pressure tight joint and consequently by my invention I avoid leakage and inaccuracy of the gauge.

What I claim is:

1. A gauge comprising two Bourdon tube springs; a pressure inlet leading to said springs; a pressure tight joint connecting said inlet and springs; a support for said springs; and a member separate from said joint and having fixed connection with said springs at a distance from the ends of the springs, this connection including a wedge between, and engaging, the springs; and means to hold said member to said support.

2. A gauge comprising two Bourdon tube springs; a pressure inlet leading to said springs; a pressure tight joint connecting said inlet and springs; a support for said springs; and a member separate from said joint and having fixed connection with said springs at a distance from the ends of the springs, this connection including a wedge integral with said member and located between, and engaging, the springs; and means to hold said member to said support.

3. A gauge comprising a Bourdon tube spring of less than a complete circle; a pressure inlet leading to said spring; a pressure tight joint connecting said inlet and spring and including a flexible tube; a support for said spring separate from said inlet and having a recess; a member separate from said joint and having integral connection with said spring at a distance from the end of the spring; and means to hold said member in place, that portion of the spring adjacent said connection being within said recess when said member is in place.

HARRY S. BAKER.